United States Patent
Takeda (10) Patent No.: US 9,167,395 B2
(45) Date of Patent: Oct. 20, 2015

(54) INFORMATION PROCESSING SYSTEM AND ELECTRONIC MESSAGE NOTIFICATION METHOD FOR INFORMATION PROCESSING SYSTEM

(75) Inventor: Atsushi Takeda, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 708 days.

(21) Appl. No.: 13/546,367

(22) Filed: Jul. 11, 2012

(65) Prior Publication Data

US 2013/0053000 A1 Feb. 28, 2013

(30) Foreign Application Priority Data

Aug. 29, 2011 (JP) ................. 2011-185420

(51) Int. Cl.
*H04W 4/12* (2009.01)
*H04W 4/14* (2009.01)
*H04W 4/20* (2009.01)
H04W 4/04 (2009.01)

(52) U.S. Cl.
CPC *H04W 4/14* (2013.01); *H04W 4/20* (2013.01); H04W 4/046 (2013.01)

(58) Field of Classification Search
CPC .................................. H04W 4/12; B60Q 1/00
USPC ............. 455/412.1–412.2, 414.1–414.4, 420, 455/466, 456.1, 566; 709/203, 206, 225, 709/226
See application file for complete search history.

(56) References Cited

U.S. PATENT DOCUMENTS

| | | | |
|---|---|---|---|
| 7,010,268 B2* | 3/2006 | Chen | G08C 17/02 455/41.2 |
| 7,636,564 B2 | 12/2009 | Funato | |
| 8,521,192 B2* | 8/2013 | Ahlgren | G01S 5/0018 455/41.1 |
| 8,620,390 B2* | 12/2013 | Suzuki | H04M 1/6091 379/93.05 |
| 8,909,302 B2* | 12/2014 | Matsushita | H04M 1/6075 455/41.2 |
| 8,923,881 B2* | 12/2014 | Sawai | H04W 72/085 370/445 |
| 2003/0212479 A1 | 11/2003 | Baghshomali et al. | |
| 2006/0052086 A1* | 3/2006 | Funato | 455/411 |
| 2007/0049255 A1* | 3/2007 | Bhakta | H04W 88/02 455/412.2 |
| 2007/0273624 A1 | 11/2007 | Geelen | |
| 2008/0032689 A1* | 2/2008 | Kubota | H04L 12/66 455/425 |
| 2009/0164586 A1* | 6/2009 | Douglas | H04L 12/587 709/206 |
| 2010/0144399 A1* | 6/2010 | Abeta | G01C 21/362 455/569.2 |
| 2011/0136461 A1* | 6/2011 | Hauser | H04M 1/72527 455/334 |
| 2011/0230169 A1* | 9/2011 | Ohki | 455/412.1 |
| 2011/0255444 A1* | 10/2011 | Soliman | H04L 41/12 370/255 |
| 2012/0329447 A1* | 12/2012 | Gilbert | H04M 1/72566 455/420 |

FOREIGN PATENT DOCUMENTS

JP       2006-107421       4/2006

* cited by examiner

*Primary Examiner* — Khawar Iqbal
(74) *Attorney, Agent, or Firm* — Brinks Gilson & Lione (57) ABSTRACT

An information processing system and an electronic message notification method for an information processing system automatically change an incoming account for which an electronic message reception notification is made. An information processing system includes an information terminal provided with a communication function and an in-vehicle device. The information terminal receives an electronic message from the exterior in a corresponding incoming account; configures an incoming account for making a notification of the reception of an electronic message; and when an electronic message has been received by the configured incoming account, notifies the in-vehicle device. The in-vehicle device determines whether or not an electronic message has been distributed to the information terminal from a specific partner; and, if so, changes the configuration of the configuration unit so that a notification that the electronic message has been received from the specific partner is made.

20 Claims, 7 Drawing Sheets

10: INFORMATION PROCESSING SYSTEM

FIG.3

30: INFORMATION TERMINAL

300: INCOMING ACCOUNT AUTOMATIC CHANGE FUNCTION

FIG.7

| TELEPHONE NUMBER | MESSAGE DISTRIBUTION | INCOMING ACCOUNT INFORMATION |
|---|---|---|
| A1 | NO | — |
| A2 | YES | SMS (INCOMING ACCOUNT 1) |
| A3 | YES | E-MAIL (INCOMING ACCOUNT 2) |
| ... | ... | ... |
| An | NO | — |

INFORMATION PROCESSING SYSTEM AND ELECTRONIC MESSAGE NOTIFICATION METHOD FOR INFORMATION PROCESSING SYSTEM

RELATED APPLICATION

The present application claims priority to Japanese Patent Application Number 2011-185420, filed Aug. 29, 2011, the entirety of which is hereby incorporated by reference.

BACKGROUND OF THE INVENTION

1. Field of the Invention

The present invention relates to information processing systems and electronic message notification methods for information processing systems, and particularly relates to methods for notifying an electronic device of an electronic message that has been received by an information terminal such as a mobile telephone. 2. Description of the Related Art Electronic devices installed in vehicles (called "in-vehicle devices" hereinafter) typically include functions for receiving television broadcasts and radio broadcasts, functions for playing back video and audio, and so on, in addition to navigation functions. Various types of services can be used by connecting such an in-vehicle device to a network or the like. For example, real-time traffic information, information of a route to a destination, or the like can be obtained by connecting the in-vehicle device to a traffic information distribution server, or updated map data can be obtained by connecting the in-vehicle device to a map distribution server; the obtained information can be used in the navigation function. Furthermore, there are also services that embed necessary information in electronic messages and distribute those electronic messages to in-vehicle devices.

In the case where an in-vehicle device is provided with a communication function, the in-vehicle device itself is provided with a data communication function, or the in-vehicle device is externally connected to a mobile telephone or the like that includes a data communication function. In recent years, multi-functionality, higher levels of performance, and higher speeds are being implemented in mobile telephones, as exemplified by smartphones; and there is demand for the ability to use functions provided in such smartphones in in-vehicle devices.

According to JP-2006-107421A, in a system that connects a mobile terminal to an in-vehicle device, it is determined whether or not an e-mail received by the mobile terminal from a server is an information liaison e-mail, and in the case where the e-mail is an information liaison e-mail, the information liaison e-mail is forwarded to the in-vehicle device. This eliminates a burden on the user when accepting the provision of a service.

Figure 1:
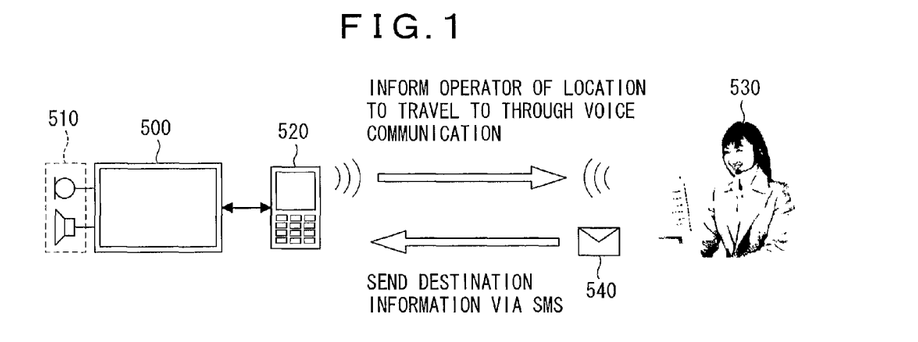
FIG. 1 is a diagram illustrating operations for setting a destination using an operator service.

What is known as an "operator service" is a way in which the in-vehicle device connects to a network or the like and receives the provision of various types of services. It is difficult for a driver to make input operations while driving, and thus this service allows the driver to speak with an operator through a hands-free call, whereupon the operator distributes necessary or useful information via an electronic message. For example, as shown in FIG. 1, a user uses a hands-free kit 510 installed in an in-vehicle device 500 to call an operator 530 via a mobile telephone 520 and inform the operator 530 of the location the user wishes to travel to through voice communication. Upon doing so, the operator 530 creates an electronic message 540 including destination information regarding a destination (the name of the destination, the latitude and longitude, the telephone number of the destination, and so on), and distributes the created electronic message 540 to the mobile telephone 520 from an electronic message distribution server. The distributed electronic message 540 is received by the mobile telephone 520 and is then forwarded from the mobile telephone 520 to the in-vehicle device 500. The in-vehicle device 500 analyzes the received electronic message 540, extracts the destination information included therein, and sets the destination for navigation using the destination information.

However, a problem such as that described hereinafter exists when using this type of operator service. As described above, in the case where the destination information is distributed to the in-vehicle device 500 through the electronic message 540, the electronic message 540 is sent to the mobile telephone 520 from the electronic message distribution server in a predetermined format, such as an SMS (Short Message Service) that is made up of a set number of characters. The in-vehicle device 500 and the mobile telephone 520 are connected through close-range wireless communication such as Bluetooth, and thus in order for the mobile telephone 520 to notify the in-vehicle device 500 that an electronic message has been received, it is necessary to configure a profile, such as a MAP (Message Access Profile), provided in the mobile telephone 520. In other words, although the mobile telephone 520 can receive electronic messages in multiple formats, a profile such as MAP limits the number of incoming accounts for which the in-vehicle device 500 can be notified of reception (for example, only one account can be configured), and thus the in-vehicle device cannot be notified of the reception of an electronic message received in an account aside from the configured incoming account. For example, if the incoming account for which a reception notification is to be made is configured for e-mail in the mobile telephone 520, when an SMS electronic message, which is in a different format than e-mail, is sent to the mobile telephone 520 through the operator service, the in-vehicle device 500 is not notified of the SMS electronic message reception by the mobile telephone 520. The user thus cannot know whether an SMS electronic message has been distributed, or in other words, cannot receive the information through the operator service.

Thus with past techniques, even if an electronic message (such as an SMS) sent through an operator service has been successfully received by a mobile telephone, if the incoming account in the mobile telephone that is used for reception notification does not match (for example, it is configured for e-mail), the user cannot know that an electronic message from the operator service has been received, and thus cannot use that service. While a notification that an electronic message from the operator service has been received can be provided if the incoming account in the mobile telephone that is used for reception notification (for example, SMS) is caused to match the incoming account for electronic messages from the operator service, new message notifications cannot be provided to the user for a different account used as a primary account (for example, an e-mail account). Furthermore, forcing the user to carry out the complicated operations for changing the incoming account used for reception notification every time increases the burden on the user.

To solve the stated past problems, it is an object of embodiments of the present invention to provide an information processing system capable of automatically changing an incoming account for making a notification regarding the reception of an electronic message, and an electronic message notification method for such an information processing system.

SUMMARY

An information processing system according to an embodiment of the present invention has an information terminal provided with a function for communicating with the exterior and an electronic device communicably connected to the information terminal. The information terminal includes: a receiving unit that receives an electronic message, received from the exterior, in a corresponding incoming account from among a plurality of incoming accounts; a configuration unit that configures an incoming account, from among the plurality of incoming accounts, for making a notification of the reception of an electronic message; and a notification unit that, when an electronic message has been received by the incoming account configured by the configuration unit, notifies the electronic device that the electronic message has been received. The electronic device includes: a determination unit that determines whether or not an electronic message has been distributed to the information terminal from a specific partner; and a configuration change unit that, in the case where the determination unit has determined that an electronic message has been distributed from the specific partner, changes the configuration of the configuration unit so that the notification unit makes a notification that the electronic message has been received from the specific partner.

Preferably, the electronic device further includes an identification unit that identifies the incoming account that receives the electronic message from the specific partner; and the configuration change unit changes the configuration of the configuration unit based on the incoming account identified by the identification unit. Preferably, the electronic device further includes: an extraction unit that extracts the incoming account configured by the configuration unit; and a comparison unit that compares the incoming account extracted by the extraction unit with the incoming account identified by the identification unit, and in the case where the two incoming accounts compared by the comparison unit do not match, the configuration change unit changes the incoming account configured by the configuration unit based on the incoming account identified by the identification unit. Preferably, the configuration change unit changes the configuration of the configuration unit to the original configuration in the case where the notification unit has made a notification of the reception of the electronic message from the specific partner. Preferably, the electronic device further includes a voice communication unit that enables voice communication using the information terminal; and the determination unit determines whether or not an electronic message is distributed based on a telephone number used by the voice communication unit. Preferably, the electronic device further includes a registration unit that registers, in advance, a telephone number along with information that is associated with the telephone number and indicates whether or not an electronic message is distributed; and the determination unit determines whether or not an electronic message is distributed by referring to the registration unit. Preferably, the registration unit includes identification information that identifies the incoming account of the electronic message distributed by the specific partner; and the identification unit identifies the incoming account based on the identification information. Preferably, the electronic device further includes an obtainment unit that, when the configuration has been changed to the original configuration by the configuration change unit, obtains an electronic message received by the original incoming account during the period when the incoming account is changed by the configuration change unit. Preferably, the electronic device determines the electronic message received by the original incoming account during the period when the incoming account is changed by the configuration change unit by comparing electronic message information accumulated in the originally-configured incoming account with electronic message information obtained by the obtainment unit. Preferably, the electronic device further includes an execution unit that executes an application based on the information included in the electronic message for which the notification has been made by the notification unit. Preferably, the electronic device is installed in a vehicle, and the configuration change unit changes the configuration of the configuration unit to the original configuration when an ignition switch of the vehicle has been turned off. Preferably, in the case where a set amount of time has passed following a configuration change, the configuration change unit changes the configuration of the configuration unit to the original configuration. Preferably, in the case where the information terminal has lost reception, the configuration change unit extends the set amount of time based on the period for which the reception is lost.

An information processing system according to the present invention has an information terminal provided with a function for communicating with the exterior, an electronic device communicably connected to the information terminal, and a distribution apparatus that distributes an electronic message including information in response to a request. The information terminal includes: a receiving unit that receives an electronic message from the exterior in a corresponding incoming account from among a plurality of incoming accounts; a configuration unit that configures an incoming account, from among the plurality of incoming accounts, for making a notification of the reception of an electronic message; and a notification unit that, when an electronic message has been received by the incoming account configured by the configuration unit, notifies the electronic device that the electronic message has been received, and when a request has been made via the information terminal, the distribution apparatus distributes, to the information terminal, an electronic message including information in response to the request. The electronic device includes: a determination unit that determines whether or not the incoming account configured by the configuration unit and the incoming account for the electronic message from the distribution apparatus match; and a configuration change unit that, in the case where it has been determined that the incoming accounts do not match, changes the configuration of the configuration unit to the incoming account for the electronic message from the distribution apparatus.

Preferably, the electronic device further includes a voice communication unit that enables voice communication using the information terminal; and the distribution apparatus distributes the electronic message to the information terminal in response to voice communication being carried out with a specific partner by the voice communication unit. Preferably, the electronic device includes a navigation function. When the voice communication unit has made a request for information regarding a destination, the distribution apparatus distributes an electronic message including the information regarding the destination to the information terminal. The notification unit notifies the electronic device of the electronic message including the information regarding the destination; and the navigation function sets the destination based on the information regarding the destination included in the electronic message for which the notification was made. Preferably, the electronic device further includes an obtainment unit that, when the configuration has been changed to the original configuration by the configuration change unit, obtains an electronic message received by the original incoming account during the period when the incoming account is changed by the configuration change unit.

An electronic message notification method according to the present invention is a method for an information processing system having an information terminal provided with a function for communicating with the exterior, an electronic device communicably connected to the information terminal, and a distribution apparatus that distributes an electronic message including information in response to a request. The method includes: a step of starting the usage of an electronic message distribution service performed by the distribution apparatus; a step of comparing the incoming account for the electronic message from the distribution apparatus with the incoming account configured in the information terminal for making a notification of the reception of an electronic message and, in the case where the two incoming accounts do not match, changing the configured incoming account to the incoming account for the distributed electronic message; a step of receiving, in the information terminal, the electronic message from the distribution apparatus; and a step of the information terminal notifying the electronic device that the electronic message has been received.

Preferably, the electronic message notification method further includes a step of changing the configuration of the incoming account in the information terminal for making a notification of the reception of an electronic message to the original configuration after the electronic device has been notified by the information terminal of the reception of an electronic message. Preferably, the electronic message distribution service includes making a request for information to an operator via the information terminal. Preferably, the notification method further includes a step of, when the configuration of the incoming account for reception notification has been changed to the original configuration, obtaining an electronic message received in the original incoming account during the period when the configuration is changed. Preferably, the notification method further includes: a step of synchronizing an incoming account in the electronic device with an incoming account in the information terminal; and a step of presenting a difference arising as a result of the synchronization as a new electronic message.

According to the present invention, the incoming account for reception notification is changed in the case where the incoming account for reception notification differs from the incoming account for the electronic message distributed from the specific partner. Accordingly, a reception notification for the electronic message distributed from the specific partner can be presented to a user without forcing the user to make complicated changes to the incoming account for reception notification, which in turn makes it possible for the user to immediately use the information included in the electronic message.

DETAILED DESCRIPTION OF THE PREFERRED EMBODIMENTS

Next, embodiments of the present invention will be described with reference to the drawings. In a preferred embodiment of the present invention, a distribution service for an electronic message including necessary or useful information is used in an in-vehicle device via a network or the like. Although the content of the information included in the electronic message is not restricted to any particular use, preferably, the information is used in a function or application provided in the in-vehicle device. Furthermore, the format of the distributed electronic message is not particularly limited, and may be SMS, e-mail, MMS, or the like.

Embodiments

Figure 2:
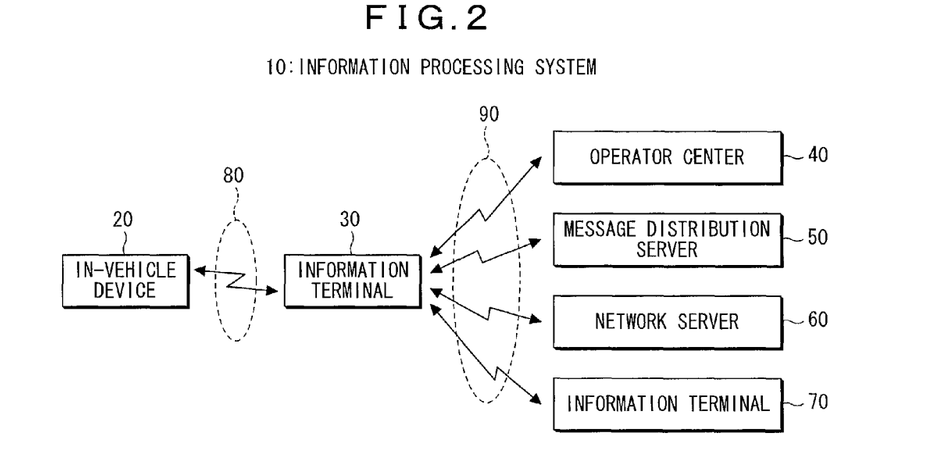
FIG. 2 is a diagram illustrating the configuration of an information processing system according to an embodiment of the present invention.

FIG. 2 is a diagram illustrating the configuration of an information processing system according to an embodiment of the present invention. This configuration is merely an example, and the present invention is not limited to this configuration. An information processing system 10 illustrated in FIG. 2 includes: an in-vehicle device 20 installed in a vehicle; a mobile information terminal 30 provided with a data communication function, a data processing function, and the like; an operator center 40 that is communicated with by the information terminal 30 using voice; a message distribution server 50; a network server 60; and another information terminal 70.

The in-vehicle device 20 is an electronic device that includes a variety of functions; these functions can include, for example, a navigation function, a function for receiving television broadcasts, radio broadcasts, or the like, a function for playing back video, audio, or the like, a function for carrying out data communication with an external device such as the information terminal 30, a hands-free telephony function, and so on.

The mobile information terminal 30 is a multifunction terminal provided with a communication function, and is, for example, a smartphone, a mobile telephone, a laptop personal computer, or the like that can be carried into the vehicle. The information terminal 30 can furthermore carry out bidirectional data communication with the in-vehicle device 20. It is desirable for a connection 80 between the in-vehicle device 20 and the information terminal 30 to be implemented as wireless communication. The connection 80 may be configured using close-range infrared communication such as Bluetooth.

A connection 90 between the information terminal 30 and the exterior is implemented through voice communication, data communication, and network communication over the Internet or the like. For example, the information terminal 30 is capable of voice communication with the operator center 40, can receive electronic messages from the message distribution server 50, can carry out interactive data exchange with the network server 60, and furthermore can exchange voice communications, electronic messages, and the like with the other information terminal 70. In the present embodiment, the operator center 40 and the message distribution server 50 may be an operator service that, in response to a request from a user, distributes an electronic message including necessary information to the information terminal 30.

Figure 3:
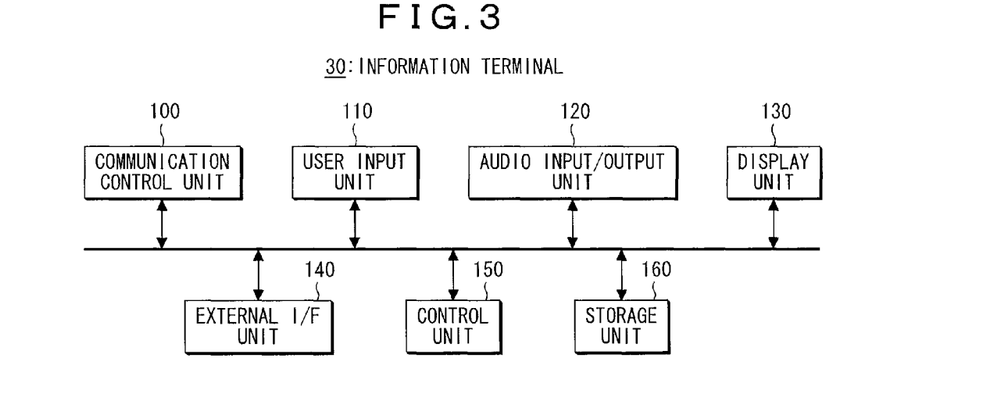
FIG. 3 is a block diagram illustrating a typical configuration of an information terminal as shown in FIG. 2.

FIG. 3 is a block diagram illustrating a typical configuration of the information terminal 30. The information terminal 30 is configured so as to include: a communication control unit 100 that controls communication with the exterior, such as the operator center 40, the message distribution server 50, the network server 60, the information terminal 70, and so on shown in FIG. 2; a user input unit 110 that accepts inputs from the user; a voice input/output unit 120 capable of inputting/outputting voice; a display unit 130; an external interface (I/F) unit 140 that connects to an external device such as the in-vehicle device 20; a control unit 150 that controls the various units; and a storage unit 160 that stores application software, programs, data, and so on.

The communication control unit 100 includes an antenna, and carries out data communication or voice communication wirelessly with the exterior via the antenna. The external I/F unit 140 connects the in-vehicle device 20 and the information terminal 30, and enables bidirectional data communication between the two devices. As will be described later, upon receiving an electronic message from the exterior, the information terminal 30 sends data necessary for making a notification regarding that reception to the in-vehicle device 20, sends information indicating the reception sensitivity of the antenna to the in-vehicle device 20 as necessary, and so on. Meanwhile, the data exchanged between the in-vehicle device 20 and the information terminal 30 includes control signals from the in-vehicle device 20 to the information terminal 30, or control signals from the information terminal 30 to the in-vehicle device 20. The control unit 150 executes various types of information processes in accordance with programs, applications, and so on prepared in advance; furthermore, via the communication control unit 100, the control unit 150 enables voice communication with the operator center 40, the information terminal 70, and so on, enables the reception of electronic messages from the message distribution server 50, enables the in-vehicle device 20 be to notified of the reception of an electronic message, enables data to be uploaded to or downloaded from various servers via the connection 90, and so on. Here, detailed descriptions will be given particularly of a function for notifying the in-vehicle device 20 of the reception of an electronic message when that electronic message has been received by the information terminal 30 from the message distribution server 50.

Figure 4:
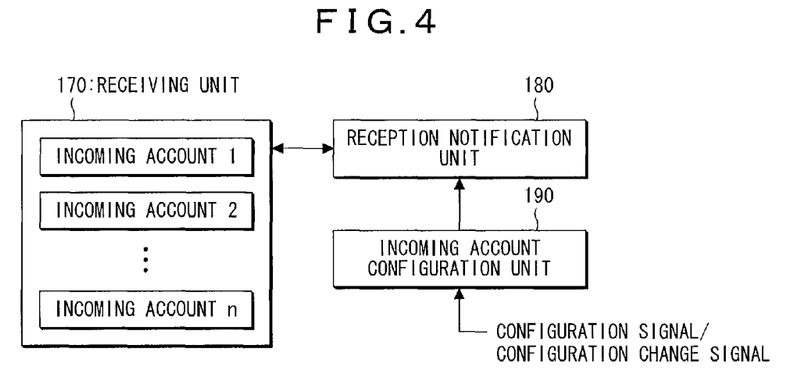
FIG. 4 is a diagram illustrating the configuration of an electronic message reception/notification function of an information terminal.

FIG. 4 is a block diagram illustrating the configuration of an electronic message reception/notification function provided in the information terminal 30. The electronic message reception/notification function is realized by a program or an application installed in the information terminal 30. The communication control unit 100 includes: a receiving unit 170 that receives, from various servers, devices, or the like connected to the exterior, an electronic message addressed to the information terminal 30; a reception notification unit 180 that, when an electronic message has been received by the receiving unit 170, notifies the in-vehicle device 20 of that reception; and an incoming account configuration unit 190 that configures the incoming account for carrying out the reception notification. The receiving unit 170 includes multiple incoming accounts 1, 2, and so on up to n, and receives the electronic message received via the communication control unit 100 in the corresponding incoming account. Typically, an incoming account is prepared based on the format of the electronic message, such as SMS (Short Message Service), e-mail, MMS (Multimedia Message Service), and so on, and the accounts receive electronic messages in those respective formats. For example, an SMS electronic message is received through an incoming account 1, an e-mail electronic message is received through an incoming account 2, and an MMS electronic message is received through an incoming account 3. However, even if the format of the electronic message is the same (for example, e-mail), multiple incoming accounts may be prepared for individual message distribution servers, or multiple incoming accounts may be prepared through user settings. Received electronic messages are accumulated in each incoming account.

When an electronic message has been received in an incoming account selected from the incoming accounts included in the receiving unit 170, the reception notification unit 180 notifies the in-vehicle device 20 of that reception. The selection of the incoming account for which a notification of reception is to be made is performed through the incoming account configuration unit 190. Meanwhile, in the reception notification carried out by the reception notification unit 180, it is preferable for the details included in the incoming account configured for reception notification to be forwarded to the in-vehicle device 20. To rephrase, when the incoming account for reception notification has been updated by receiving an electronic message, the reception notification unit 180 forwards the details of the incoming account to the in-vehicle device 20. Although this method reduces the processing burden of the reception notification for the information terminal 30, it is also possible for the reception notification unit 180 to notify the in-vehicle device 20 that an electronic message has been received and then forward that electronic message when the in-vehicle device 20 has requested the electronic message to be forwarded.

The incoming account configuration unit 190 configures the incoming account for which a reception notification should be made based on a configuration signal from a user input or a configuration change signal from the in-vehicle device 20. The incoming account configuration information is stored in a register, the storage unit 160, or the like, and is referred to by the user or the in-vehicle device 20 as necessary. In a preferred example, when the in-vehicle device 20 and the information terminal 30 are connected using Bluetooth, the reception notification of an electronic message is managed by an MAP (Message Access Profile); with MAP, only a single incoming account can be configured for making reception notifications. Accordingly, assuming that the incoming account 2 is configured as the incoming account for reception notification, even if an electronic message is received by another incoming account 1, 3, and so on up to n, the in-vehicle device 20 is not notified thereof. However, MAP is only described here as an example, and the reception notification may be carried out using a communication protocol aside from MAP. In such a case, the number of incoming accounts that can be configured for reception notification is not necessarily limited to one, and multiple accounts may be configured in such a manner.

Figure 5:
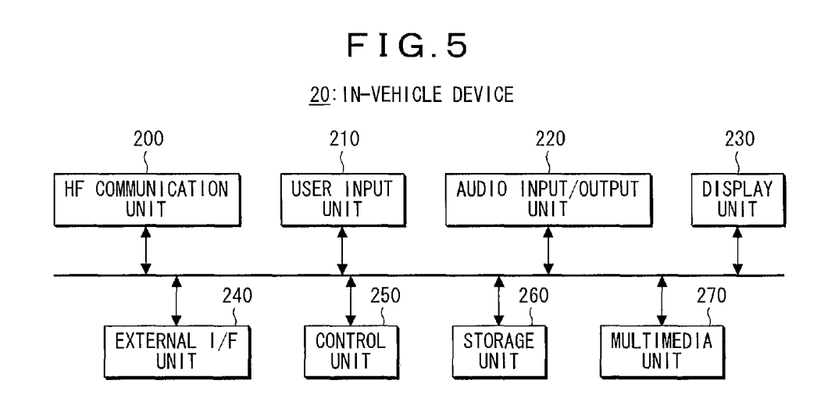
FIG. 5 is a block diagram illustrating the configuration of an in-vehicle device according to an embodiment.

FIG. 5 is a block diagram illustrating the configuration of the in-vehicle device 20. The in-vehicle device 20 is configured so as to include: a hands-free (HF) communication unit 200 that enables hands-free conversation using the information terminal 30 when the information terminal 30 is connected; a user input unit 210 that accepts inputs from the user; an audio input/output unit 220 that inputs/outputs audio; a display unit 230; an external interface (I/F) unit 240 that connects to an external device such as the information terminal 30; a control unit 250 that controls the various units; a storage unit 260 that stores application software, programs, data, and the like; and a multimedia unit 270.

The hands-free communication unit 200 uses a hands-free kit such as a microphone, an earphone, and the like to enable voice communication using a telephony function of the information terminal 30. In the present embodiment, as will be described later, hands-free conversation is carried out with the operator center 40 when using the operator service. Programs for executing a navigation function, programs for executing control regarding reception notifications for electronic messages with the information terminal 30, and so on are stored in the storage unit 260. The multimedia unit 270 includes a playback unit for playing back DVDs, Blu-Ray discs, and the like, a reception unit for receiving terrestrial digital television broadcasts, radio broadcasts, and the like, and so on. Although not shown in FIG. 5, it should be noted that the in-vehicle device 20 can also include a GPS receiver, a self-contained navigation sensor, or the like required by the navigation function.

Figure 6:
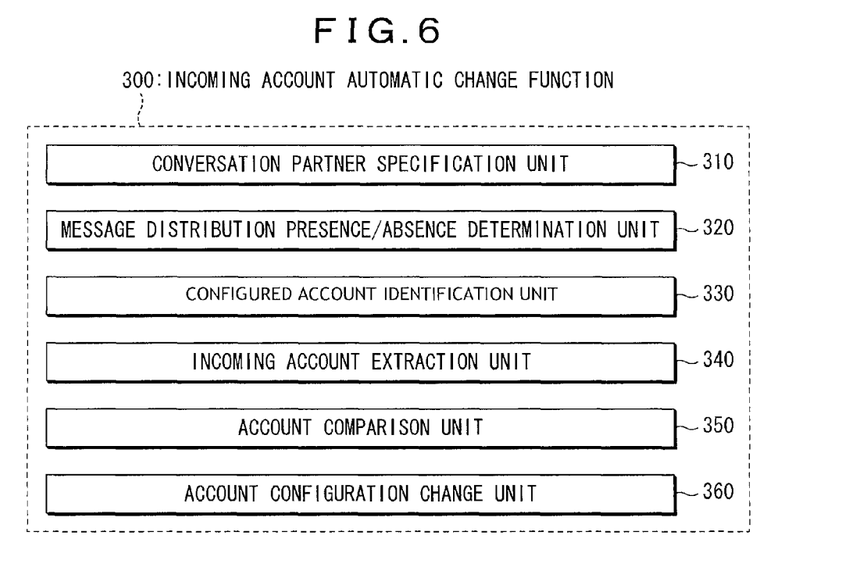
FIG. 6 is a diagram illustrating an electronic message incoming account automatic change function of an in-vehicle device according to an embodiment.

FIG. 6 is a block diagram illustrating the configuration of an incoming account automatic change function of the in-vehicle device 20. This function is executed by a program or an application installed in the in-vehicle device 20. An incoming account automatic change function 300 enables the in-vehicle device 20 to change the configuration made by the incoming account configuration unit 190 of the information terminal 30. Preferably, the incoming account automatic change function 300 includes: a conversation partner specification unit 310 that specifies a conversation partner with which to carry out voice communication via the information terminal 30; a message distribution presence/absence determination unit 320 that determines whether or not an electronic message is directly or indirectly distributed from a conversation partner with which voice communication has been carried out; an incoming account identification unit 330 that, in the case where it has been determined that a message has been distributed, identifies an incoming account to which the message has been distributed; a configured account extraction unit 340 that extracts an incoming account configured by the incoming account configuration unit 190 of the information terminal 30; an account comparison unit 350 that determines whether or not the incoming account identified by the incoming account identification unit 330 and the configured account extracted by the configured account extraction unit 340 match; and an account configuration change unit 360 that changes the configured incoming account in the information terminal 30 based on the account comparison unit 350.

Figure 7:
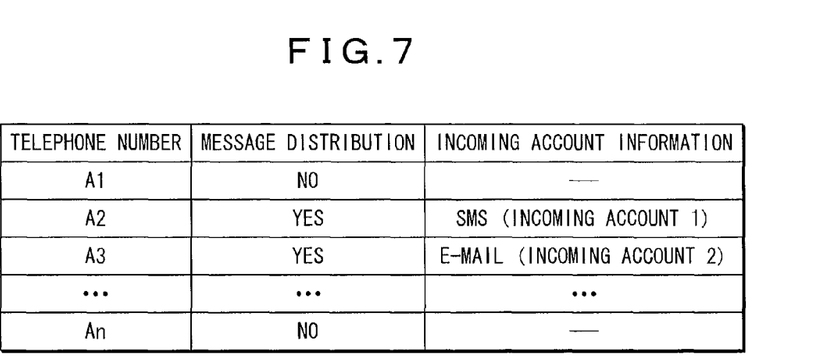
FIG. 7 is a diagram illustrating the configuration of a contact list registered in an in-vehicle device according to an embodiment.

The conversation partner specification unit 310 preferably specifies a conversation partner from a contact list or the like registered in the storage unit 260 of the in-vehicle device 20. FIG. 7 is a diagram illustrating an example of such a contact list. The contact list includes telephone numbers, as well as the presence/absence of message distribution and incoming account information as attribute information thereof. For example, if the telephone number is "A1", message distribution is "no", whereas if the telephone number is "A2", message distribution is "yes". In other words, this indicates that in the case where the telephone number "A2" is called, a message distribution service is valid. Meanwhile, information indicating the format of the electronic message is registered in the incoming account information as information for specifying the incoming account of the distributed electronic message. If the telephone number is "A2", an SMS electronic message is distributed, whereas if the telephone number is "A3", an e-mail electronic message is distributed. However, the information for identifying the incoming account may include, for example, the address of a message distribution server, a user ID, password, account name, or the like for accepting electronic message distribution, and so on; that is, any information necessary to configure the incoming account for reception notification in the information terminal 30 may be used.

The message distribution presence/absence determination unit 320 determines the presence/absence of message distribution by referring to the attribute information of the presence/absence of message distribution associated with the specified conversation partner, or in other words, the telephone number. In the example shown in FIG. 7, in the case where the telephone number "A2" or "A3" has been called, the message distribution presence/absence determination unit 320 determines "yes" for message distribution. The incoming account identification unit 330 identifies the incoming account by referring to the incoming account information associated with the telephone number of the specified conversation partner. Note that the incoming account identification unit 330 need not identify the incoming account in the case where "no" has been determined for message distribution.

The configured account extraction unit 340 carries out data communication with the information terminal 30 and extracts configuration information of the incoming account configured by the incoming account configuration unit 190. The extraction of this configuration information may be carried out by the in-vehicle device 20 requesting the information terminal 30 to send the configuration information, but alternatively, the configuration information may be automatically sent to the in-vehicle device 20 when the incoming account configuration unit 190 has configured the incoming account. In this case, the in-vehicle device 20 saves the sent configuration information in a register, the storage unit 260, or the like, and updates the configuration information each time the configuration information is sent from the information terminal 30.

The account comparison unit 350 compares the incoming account identified by the incoming account identification unit 330 with the incoming account identified based on the configuration information extracted by the configured account extraction unit 340, and presents the comparison result to the account configuration change unit 360. In the case where the two incoming accounts match, the account configuration change unit 360 keeps the configuration made by the incoming account configuration unit 190, or in other words, does not carry out any operations for changing the configuration. On the other hand, in the case where the two incoming accounts do not match, the account configuration change unit 360 sends a configuration change signal to the information terminal 30 so that the configuration of the incoming account identified by the incoming account identification unit 330 is changed. The incoming account configuration unit 190 changes the incoming account for reception notification in the receiving unit 170 via the reception notification unit 180 in response to the configuration change signal. At this time, the incoming account configuration unit 190 saves the original configuration information.

Next, operations performed by the information processing system according to the present embodiment will be described. Here, an example in which the distribution of an electronic message including destination information regarding a destination is accepted using an operator service will be described. Furthermore, it is assumed that the format of the distributed electronic message is SMS, the incoming account 1 of the information terminal 30 corresponds to SMS, and the incoming account 2 corresponds to e-mail.

Figure 8:
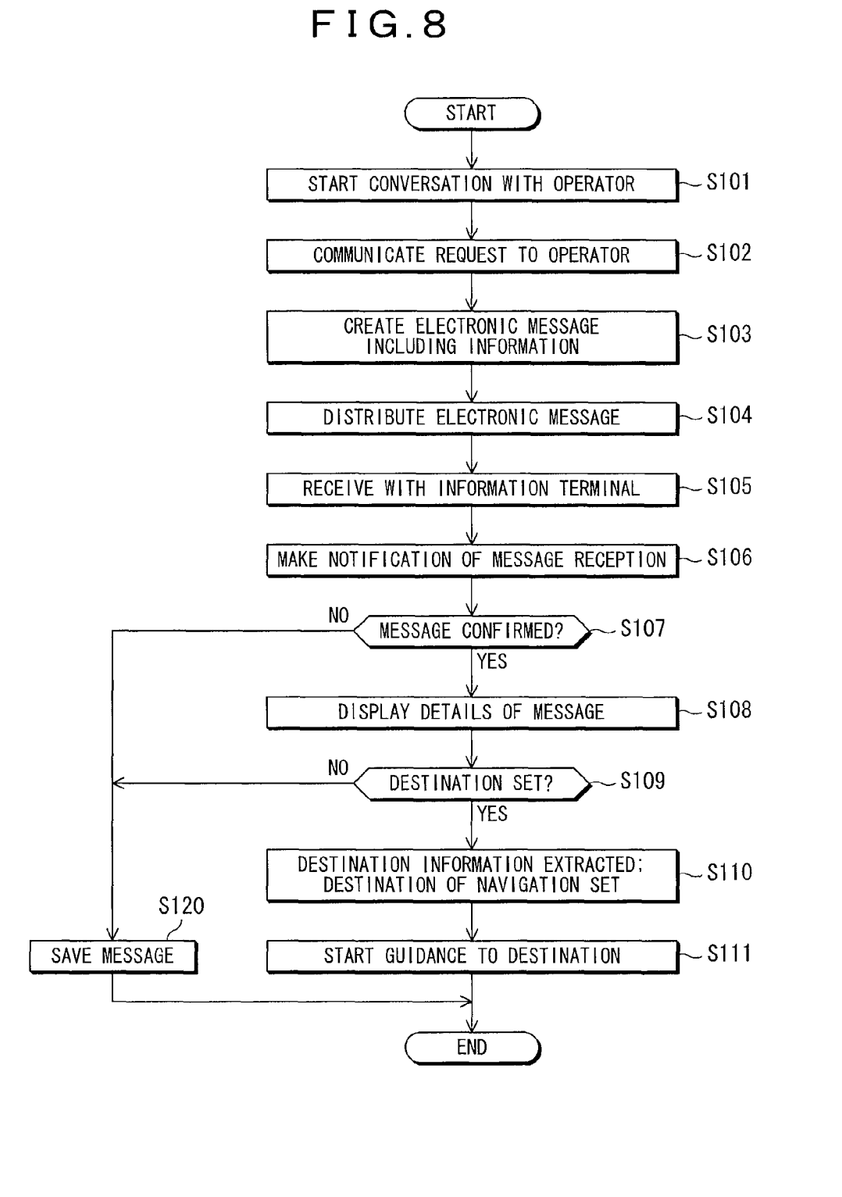
FIG. 8 is a flowchart illustrating operations carried out by an information processing system according to an embodiment for distributing an electronic message through an operator service.

FIG. 8 is a flowchart illustrating operations performed when using the operator service. Here, it is assumed that the incoming account 1 is configured for reception notification in the information terminal 30. The information terminal 30 is carried into a vehicle, and the information terminal 30 is connected to the in-vehicle device 20 through Bluetooth or the like. Next, a navigation application is launched by the in-vehicle device 20, and an operator service 402 is selected in a destination setting screen 400 illustrated in FIG. 10. This starts the usage of an electronic message distribution service carried out through the operator service.

The in-vehicle device 20 searches out the telephone number of the operator service from the contact list in response to the operator service being selected. Next, the hands-free communication unit 200 calls the operator center 40 via the information terminal 30 based on the searched telephone number, and establishes voice communication with the operator center 40 (S101). The user, who is, for example, the driver, makes a request to the operator; in this case, the user informs the operator of the location to which the user wishes to travel (S102). The operator or an individual instructed by the operator creates an electronic message including the destination information (for example, the latitude and longitude of the destination, the facility name of the destination, the telephone number, or the like) for specifying the location to which the user wishes to travel (S103), and distributes the created electronic message from the message distribution server 50 to the information terminal 30 in the SMS format (S104).

The distributed electronic message is received in the incoming account 1, corresponding to SMS, by the receiving unit 170 of the information terminal 30 (S105). The reception notification unit 180 detects that a new message has been received in the incoming account 1, and here, because the incoming account 1 is configured for reception notification, the reception notification unit 180 notifies the in-vehicle device 20 that an electronic message has been received (S106). As described above, the reception notification may simply be a notification that the message has been received, or may forward all or a set number of the latest electronic messages accumulated in the incoming account 1.

Figure 11:
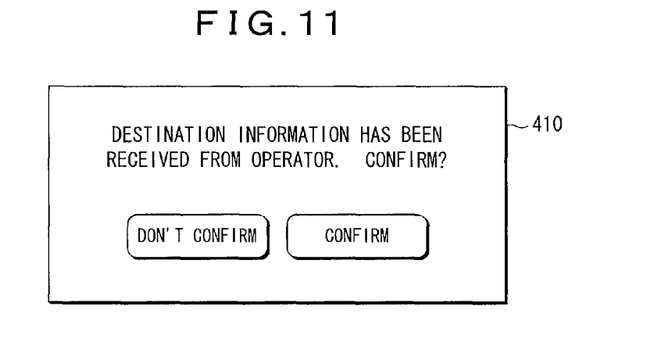
FIG. 11 is an example of a screen displayed when a notification has been made by an information terminal regarding the reception of an electronic message including destination information.

When the electronic message reception notification has been received by the in-vehicle device 20 via the external I/F unit 240, the control unit 250 makes a display in the display unit 230 to communicate that the electronic message has been received, and prompts the user to make an input as to whether or not to confirm the details of the electronic message (S107). For example, a confirmation screen 410 such as that shown in FIG. 11 is displayed in the display unit 230. Here, when the user makes an input for confirming the details of the electronic message, the control unit 250 displays the details of the message, including the destination information, in the display unit 230 (S108). This screen once again prompts the user to make an input as to whether or not to set the destination (S109), and when an input for setting the destination has been made, the control unit 250 extracts the destination information from the electronic message, uses that information to set the navigation destination (S110), and then begins guiding the user to the destination (S111). On the other hand, when the details of the electronic message are not confirmed (S107) and when the destination is not set (S109), the distributed electronic message is saved in the storage unit 260. The saved electronic message can be read out by the user when necessary and used to set the destination later on.

Figure 9:
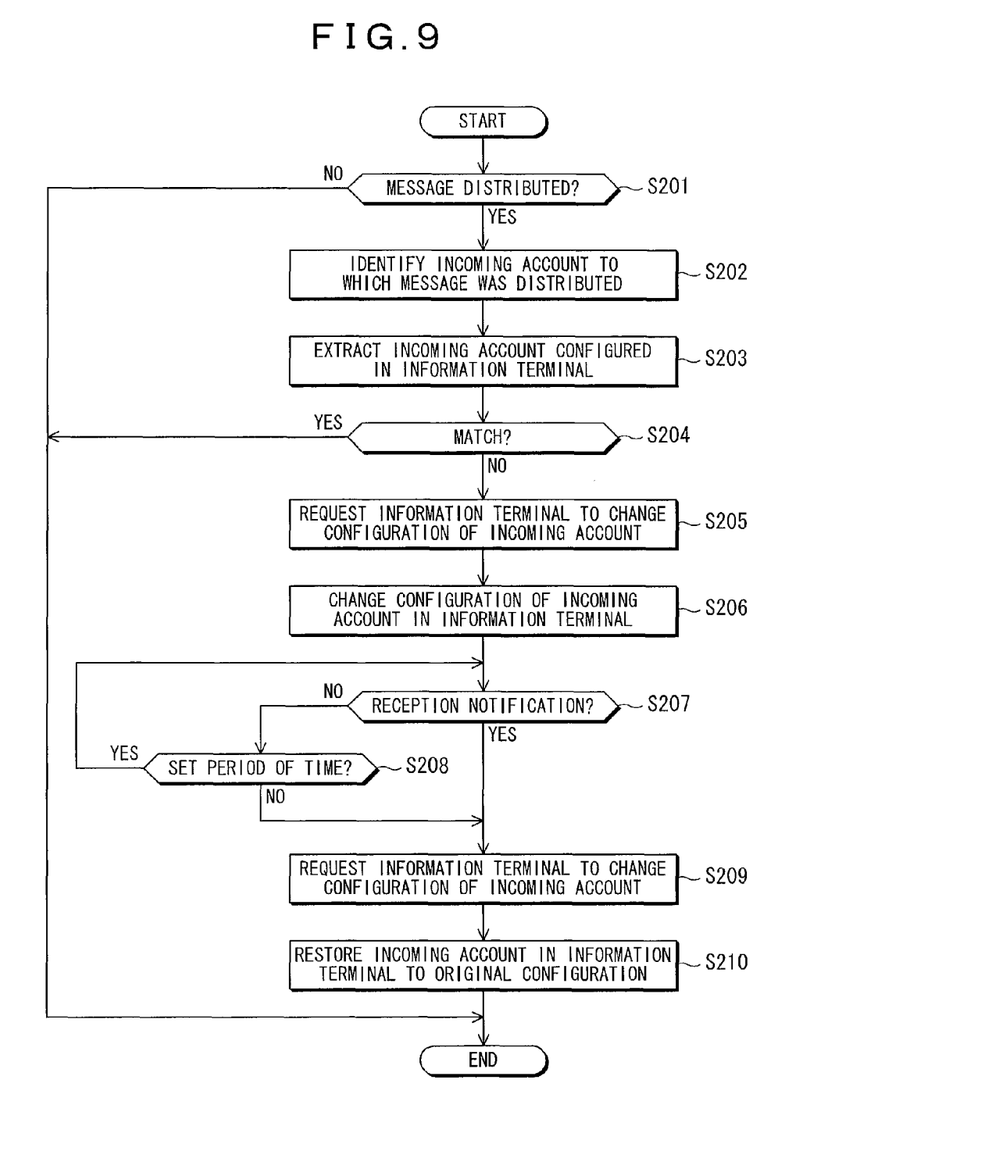
FIG. 9 is a flowchart illustrating operations carried out by an information processing system according to an embodiment for changing an incoming account for electronic messages.
Figure 10:
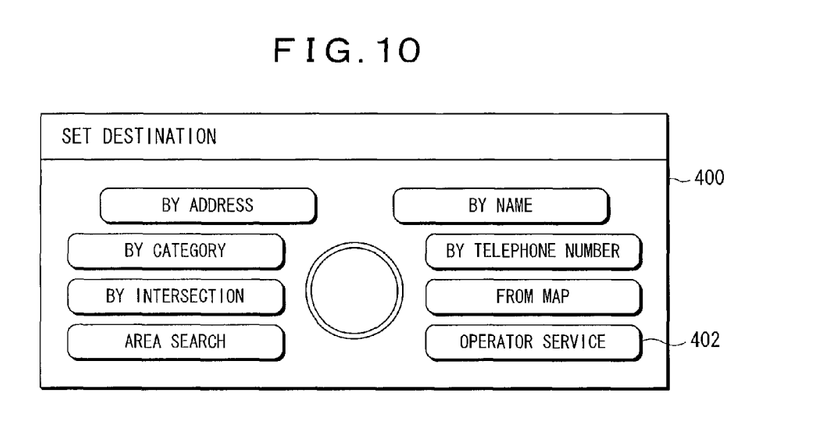
FIG. 10 is an example of a destination setting screen in a navigation function of an in-vehicle device.

Next, operations for automatically changing the incoming account configured in the information terminal 30 will be described with reference to the flowchart in FIG. 9. Here, it is assumed that the incoming account 2 (e-mail) is configured for reception notification in the information terminal 30, but an SMS electronic message has been distributed from the message distribution server 50. As shown in FIG. 10, when the user selects the operator service, the conversation partner specification unit 310 refers to the contact list shown in FIG. 7, searches out the telephone number of the operator service, and specifies the conversation partner. The message distribution presence/absence determination unit 320 refers to the attribute information of the searched-out telephone number, and determines whether or not an electronic message will be distributed in the case where the operator service is used (S201). In the case where "yes" has been determined for the electronic message distribution, the incoming account identification unit 330 identifies the incoming account to which the electronic message will be distributed (S202).

Next, in order to identify the incoming account for reception notification configured in the information terminal 30, the configured account extraction unit 340 extracts the configuration information thereof. The in-vehicle device 20 may request the information terminal 30 to send the configuration information, or, if the configuration information has already been sent when the incoming account configuration unit 190 carried out the configuration, saved configuration information is read out. Next, the account comparison unit 350 compares the incoming account identified by the incoming account identification unit 330 with the incoming account extracted by the configured account extraction unit 340, and determines whether or not the two accounts match (S204). Here, although the incoming account for the distributed electronic message is the incoming account 1, which corresponds to SMS, the incoming account configured by the incoming account configuration unit 190 is the incoming account 2, which corresponds to e-mail, and thus the two incoming accounts do not match.

The result of the comparison made by the account comparison unit 350 is presented to the account configuration change unit 360. In the case where the two incoming accounts do not match, the account configuration change unit 360 sends a configuration change signal, requesting the configuration of the incoming account to be changed, to the information terminal 30 (S205). In other words, the account configuration change unit 360 sends, to the information terminal 30, a configuration change signal for changing the incoming account configured by the incoming account configuration unit 190 to the incoming account identified by the incoming account identification unit 330. It is preferable for this signal to be sent after the voice communication with the operator center 40 has ended.

In the information terminal 30, when the incoming account configuration unit 190 has received the configuration change signal from the account configuration change unit 360, the incoming account configuration unit 190 changes the incoming account for reception notification based on that configuration change signal (S206). In this example, the account configuration change unit 360 changes the configuration from the incoming account 2 to the incoming account 1 based on the configuration change signal. As a result, when an electronic message has been received in the incoming account 1, the reception notification unit 180 notifies the in-vehicle device 20 of the reception thereof.

The account configuration change unit 360 monitors whether or not the information terminal 30 has notified the in-vehicle device 20 of the reception of an electronic message (S207). It is preferable for this monitoring to be set to a set period (S208); in the case where a reception notification has been made during this period, the account configuration change unit 360 sends, to the information terminal 30, the configuration change signal so that the configuration made by the incoming account configuration unit 190 is changed to the original configuration (S209). The incoming account configuration unit 190 restores the incoming account to its original configuration in response to this configuration change signal (S210). In this example, the incoming account configuration unit 190 changes the configuration from the incoming account 1 to the original incoming account 2.

On the other hand, in the case where the account comparison unit 350 has determined that the two incoming accounts match, the account configuration change unit 360 does not request the information terminal 30 to change the configuration (S204). Meanwhile, in the case where a reception notification is not made after a set amount of time has passed following the change to the configuration of the incoming account, it is determined that an electronic message has not been distributed; the account configuration change unit 360 then makes a request to restore the configuration of the incoming account to its original configuration (S208, S209). Thus in the case where the incoming account for reception notification and the incoming account to which an electronic message is distributed do not match, the incoming account for reception notification is automatically changed; accordingly, the user can know that an electronic message from the operator service has been received without carrying out a complicated procedure for changing the incoming account, and can also quickly use the information included in that electronic message.

Although the above example describes the configuration of the incoming account for reception notification being restored to the original configuration when a reception notification for an electronic message has been made, it is possible for a case to arise where the electronic message for which the reception notification has been made differs from an electronic message from the operator service. In such a case, as shown in FIG. 11, the incoming account for reception notification may be restored to the original configuration under the condition that the details of the electronic message received from the operator service have been confirmed.

In addition, although the above example describes restoring the configuration of the incoming account to its original configuration in the case where a reception notification for the electronic message has not been carried out within a set amount of time, the set amount of time may be variable based on the state of travel of the vehicle. For example, in the case where the reception sensitivity of the information terminal 30 has dropped or reception has been lost due to the travel of the vehicle, the information terminal 30 cannot receive electronic messages from the message distribution server 50 during that time. Accordingly, it is desirable for the account configuration change unit 360 to extend the set amount of time by an amount equivalent to a period during which the reception sensitivity of the information terminal 30 has dropped below a threshold or reception has been lost, or an amount equivalent to an additional predetermined period.

Furthermore, in the case where the ignition switch of the vehicle has been turned off, it is assumed that the destination information from the operator service will not be used, and thus it is desirable for the account configuration change unit 360 to restore the incoming account to its original configuration.

Next, a second embodiment of the present invention will be described. In the case where a change has been made to the configuration of the incoming account, such as a case where the incoming account 2 has been changed to the incoming account 1, the in-vehicle device 20 is not notified of the reception of an electronic message received by the incoming account 2 during that period. The second embodiment relates to the obtainment of an electronic message received by the originally-configured incoming account during a period in which the configuration has been changed.

Figure 12:
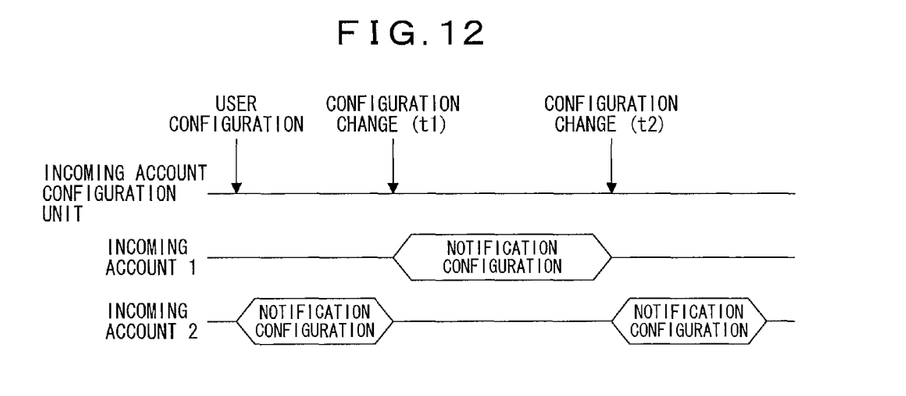
FIG. 12 is a diagram illustrating a relationship between settings in an incoming account configuration unit and an incoming account for which a notification of reception is made according to a second embodiment of the present invention.

FIG. 12 illustrates a relationship between a configuration made by the incoming account configuration unit 190 and an incoming account for which a reception notification is made. Based on user settings, the incoming account configuration unit 190 originally configures the incoming account 2 as the account for reception notification. At a time t1 at which the usage of the electronic message distribution service performed by the operator is started, the incoming account configuration unit 190 changes the configuration from the incoming account 2 to the incoming account 1 based on the configuration change signal from the in-vehicle device 20. Furthermore, at a time t2 at which the electronic message distribution service performed by the operator is ended, the incoming account configuration unit 190 restores the configuration from the incoming account 1 to the incoming account 2 based on the configuration change signal from the in-vehicle device 20. Accordingly, even if an electronic message has been received by the incoming account 2 during the period from the time t1 to the time t2, there are cases where the user cannot be aware of that reception.

Figure 13:
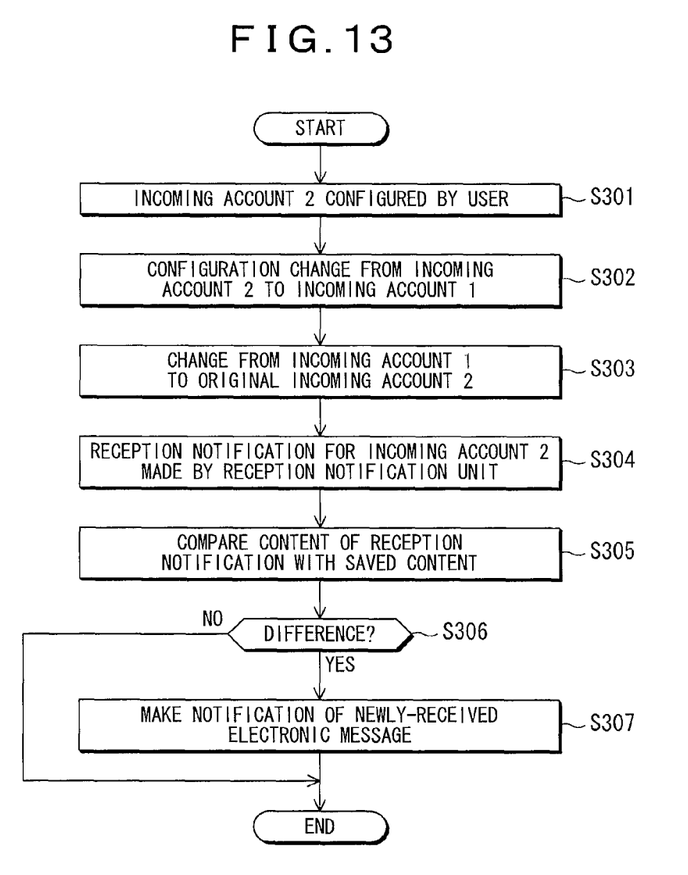
FIG. 13 is a flowchart illustrating operations performed by an information processing system according to a third embodiment of the present invention.

FIG. 13 is a flowchart illustrating operations performed in a third embodiment. As described above, the incoming account 2 is configured by the user for reception notification (S301), the configuration is changed to the incoming account 1 at the time t1 (S302), and the configuration is changed back to the original incoming account 2 at the time t2 (S303). In response to the time t2, or in other words, in response to the incoming account configuration unit 190 restoring the configuration to the original incoming account 2, the reception notification unit 180 of the information terminal 30 notifies the in-vehicle device 20 that the original incoming account 2 has received an electronic message (S304). This reception notification is carried out automatically regardless of whether or not a new electronic message has been received by the incoming account 2 during the period spanning from the time t1 to the time t2. This reception notification is carried out by forwarding the content accumulated in the incoming account 2 to the in-vehicle device 20 as-is.

Preferably, the in-vehicle device 20 includes an incoming account that is synchronized with the incoming account of the information terminal. Accordingly, by comparing the content of the incoming account 2 for which reception notification has been carried out with the content of the incoming account 2 saved in the storage unit 260 (S305), the control unit 250 of the in-vehicle device 20 can easily determine whether or not there is a difference between the two (S306). This difference is identified by comparing, for example, timestamps, the numbers of characters, the numbers of messages, and so on of the electronic messages. In the case where there is a difference, the control unit 250 assumes the difference is an electronic message that has been newly received between the time t1 and the time t2, and carries out the reception notification or displays the new electronic message in the display unit 230 (S307).

Figure 14:
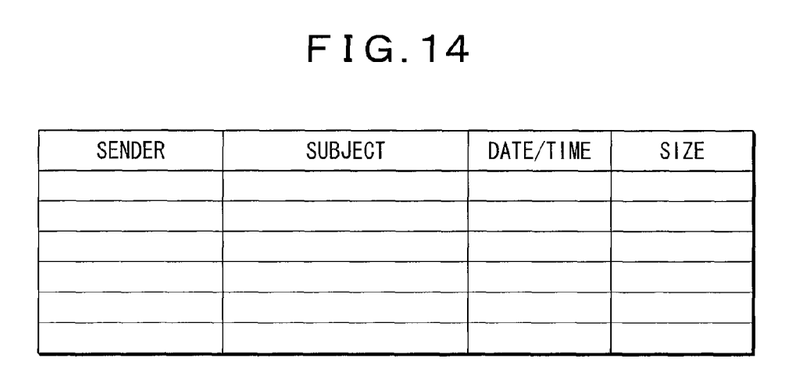
FIG. 14 is a diagram illustrating an example of history information included in an incoming account.

Preferably, the information terminal 30 and the in-vehicle device 20 can include history information in the incoming account, as shown in FIG. 14. The history information is, as shown in FIG. 14, a history for each electronic message, and includes, for example, the sender, the subject, the date and time, the size, and so on. If the history information is included when the in-vehicle device 20 is notified of a reception by the information terminal 30, a difference may be determined by comparing the instances of history information.

In this manner, in response to the incoming account used for reception notification being restored to the original configuration, a reception notification is carried out for an electronic message received by another incoming account while the operator service is being used; accordingly, the user can know that an electronic message has been received, and can know the details of that electronic message, without fail.

Although the aforementioned embodiments describe an example of automatically changing the incoming account at the time when an electronic message distribution service provided by an operator is accepted, the present invention is not limited to such a distribution service. For example, the present invention can also be applied in the case where it is known that an electronic message distribution service will be accepted from a specific message distribution server. In other words, if the conditions under which electronic messages are distributed are known, the configuration of the incoming account can be changed automatically in correspondence therewith. For example, in the case where an electronic message in e-mail format is distributed every Monday between 9:00 and 10:00 AM, the configuration of the incoming account for the reception notification is changed so that reception notifications for electronic messages are active during that time period. Meanwhile, in the case where electronic messages are distributed in the SMS format when a specific server on the Internet is logged in to, if an address such as a URL of the specific server is registered in advance and that address has been accessed, the configuration of the incoming account for the reception notification is changed so that reception notifications for distributed electronic messages are active.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An information processing system having an information terminal provided with a function for communicating with the exterior and an electronic device communicably connected to the information terminal, wherein the information terminal includes:
a receiving unit that receives an electronic message, received from the exterior, in a corresponding incoming account from among a plurality of incoming accounts included in the receiving unit;
a configuration unit that configures an incoming account, from among the plurality of incoming accounts, for making a notification of the reception of an electronic message received by the incoming account configured by the configuration unit; and
a notification unit that, when an electronic message has been received by the incoming account configured by the configuration unit, notifies the electronic device that the electronic message has been received, and
the electronic device includes:
a determination unit that determines whether or not an electronic message has been distributed to the information terminal from a specific partner; and
a configuration change unit that, in the case where the determination unit has determined that an electronic message has been distributed from the specific partner, changes the configuration of the configuration unit so that the notification unit makes a notification that the electronic message has been received from the specific partner;
wherein the electronic device determines the electronic message received by the original incoming account during the period when the incoming account is changed by the configuration change unit by comparing electronic message information accumulated in the originally-configured incoming account with electronic message information about the electronic message received by the original incoming account during the period when the incoming account is changed by the configuration change unit.

2. The information processing system according to claim 1, wherein the electronic device further includes an identification unit that identifies the incoming account that receives the electronic message from the specific partner; and
the configuration change unit changes the configuration of the configuration unit based on the incoming account identified by the identification unit.

3. The information processing system according to claim 2, wherein the electronic device further includes:
an extraction unit that extracts the incoming account configured by The configuration unit; and
a comparison unit that compares the incoming account extracted by the extraction unit with the incoming account identified by the identification unit, and
in the case where the two incoming accounts compared by the comparison unit do not match, the configuration change unit changes the incoming account configured by the configuration unit based on the incoming account identified by the identification unit.

4. The information processing system according to claim 1, wherein the configuration change unit changes the configuration of The configuration unit to the original configuration in the case where the notification unit has made a notification of the reception of the electronic message from the specific partner.

5. The information processing system according to claim 4, wherein the electronic device further includes an obtainment unit that, when the configuration has been changed to the original configuration by the configuration change unit, obtains an electronic message received by the original incoming account during the period when the incoming account is changed by the configuration change unit.

6. The information processing system according to claim 1, wherein the electronic device further includes a voice communication unit that enables voice communication using the information terminal; and
the determination unit determines whether or not an electronic message is distributed based on a telephone number used by the voice communication unit.

7. The information processing system according to claim 6, wherein the electronic device further includes a registration unit that registers, in advance, a telephone number along with information that is associated with the telephone number and indicates whether or not an electronic message is distributed; and
the determination unit determines whether or not an electronic message is distributed by referring to the registration unit.

8. The information processing system according to claim 7, wherein the registration unit includes identification information that identifies the incoming account of the electronic message distributed by the specific partner; and
the identification unit identifies the incoming account based on the identification information.

9. The information processing system according to claim 1, wherein in the case where a set amount of time has passed following a configuration change, the configuration change unit changes the configuration of the configuration unit to the original configuration.

10. The information processing system according to claim 9, wherein in the case where the information terminal has lost reception, the configuration change unit extends the set amount of time based on the period for which the reception is lost.

11. An information processing system having an information terminal provided with a function for communicating with the exterior, an electronic device communicably connected to the information terminal, and a distribution apparatus that distributes an electronic message including information in response to a request,
wherein the information terminal includes:
a receiving unit that receives an electronic message, received from the exterior, in a corresponding incoming account from among a plurality of incoming accounts included in the receiving unit;
a configuration unit that configures an incoming account, from among the plurality of incoming accounts, for making a notification of the reception of an electronic message received by the incoming account configured by the configuration unit; and
a notification unit that, when an electronic message has been received by the incoming account configured by the configuration unit, notifies the electronic device that the electronic message has been received, and
when a request has been made via the information terminal, the distribution apparatus distributes, to the information terminal, an electronic message including information in response to the request, and
the electronic device includes:
a determination unit that determines whether or not the incoming account configured by the configuration unit and the incoming account for the electronic message from the distribution apparatus match; and
a configuration change unit that, in the case where it has been determined that the incoming accounts do not match, changes the configuration of the configuration unit to the incoming account for the electronic message from the distribution apparatus;
wherein the electronic device determines the electronic message received by the original incoming account during the period when the incoming account is changed by the configuration change unit by comparing electronic message information accumulated in the originally-configured incoming account with electronic message information about the electronic message received by the original incoming account during the period when the incoming account is changed by the configuration change unit.

12. The information processing system according to claim 11,
wherein the electronic device further includes a voice communication unit that enables voice communication using the information terminal; and
the distribution apparatus distributes the electronic message to the information terminal in response to voice communication being carried out with a specific partner by the voice communication unit.

13. The information processing system according to claim 12,
wherein the electronic device includes a navigation function;
when the voice communication unit has made a request for Information regarding a destination, the distribution apparatus distributes an electronic message including the information regarding the destination to the information terminal;
the notification unit notifies the electronic device of the electronic message including the information regarding the destination; and
the navigation function sets the destination based on the information regarding the destination included in the electronic message for which the notification was made.

14. The information processing system according to claim 11,
wherein the configuration change unit changes the configuration of the configuration unit to the original configuration in the case where the notification unit has made a notification of the reception of the electronic message from the specific partner.

15. The information processing system according to claim 14,
wherein the electronic device further includes an obtainment unit that, when the configuration has been changed to the original configuration by the configuration change unit, obtains an electronic message received by the original incoming account during the period when the incoming account is changed by the configuration change unit.

16. An electronic message notification method for an information processing system having an information terminal provided with a function for communicating with the exterior, an electronic device communicably connected to the information terminal, and a distribution apparatus that distributes an electronic message including information in response to a request, the method comprising:
a step of starting the usage of an electronic message distribution service performed by the distribution apparatus;
a step of comparing the incoming account for the electronic message from the distribution apparatus with the incoming account configured in the information terminal for making a notification of the reception of an electronic message and, in the case where the two incoming accounts do not match, changing the configured incoming account to the incoming account for the distributed electronic message;

a step of receiving, in the information terminal, the electronic message from the distribution apparatus; and a step of the information terminal notifying the electronic device that the electronic message has been received;

wherein determining a match for the electronic message received by the original incoming account during the period when the incoming account is changed comprises comparing electronic message information accumulated in the originally-configured incoming account with electronic message information about the electronic message received by the original incoming account during the period when the incoming account is changed.

17. The notification method according to claim 16, further comprising:

a step of changing the configuration of the incoming account in the information terminal for making a notification of the reception of an electronic message to the original configuration after the electronic device has been notified by the information terminal of the reception of an electronic message.

18. The notification method according to claim 17, wherein the electronic message distribution service includes making a request for information to an operator via the information terminal.

19. The notification method according to claim 16, further comprising:

a step of changing the configuration of the incoming account to the Original configuration after a notification has been made for the reception of an electronic message.

20. The notification method according to claim 19, further comprising:

a step of, when the configuration of the incoming account for Reception notification has been changed to the original configuration, obtaining an electronic message received in the original incoming account during the period when the configuration is changed.

* * * * *

UNITED STATES PATENT AND TRADEMARK OFFICE
CERTIFICATE OF CORRECTION

PATENT NO.        : 9,167,395 B2
APPLICATION NO.   : 13/546367
DATED             : October 20, 2015
INVENTOR(S)       : Atsushi Takeda It is certified that error appears in the above-identified patent and that said Letters Patent is hereby corrected as shown below:

In the Claims

In column 16, claim 1, line 23, immediately after "of the configuration unit" insert --, if necessary, to an incoming account corresponding to the electronic message--.

In column 16, claim 3, line 48, after "figured by" replace "The" with --the--.

In column 16, claim 4, line 59, after "figuration of" replace "The" with --the--.

In column 18, claim 13, line 28, before "regarding a destination," replace "Information" with --information--.

In column 20, claim 19, line 10, after "account to the" replace "Original" with --original--.

Signed and Sealed this
Twenty-second Day of March, 2016

Michelle K. Lee
*Director of the United States Patent and Trademark Office*